3,413,357
PRODUCTION OF ALPHA-NAPHTHOL
Kenneth F. Bursack and Ernest L. Johnston, Wichita, Kans., and Herbert J. Moltzan, Dallas, Tex., assignors to Frontier Chemical Company, Division of Vulcan Materials Company, Wichita, Kans., a corporation of New Jersey
No Drawing. Filed July 21, 1965, Ser. No. 473,849
15 Claims. (Cl. 260—629)

---

ABSTRACT OF THE DISCLOSURE

Chloronaphthalene is preferentially hydrolyzed under reaction conditions which have been found to produce a naphthol product consisting of alpha- and beta-naphthol in which the weight ratio of alpha-naphthol to beta-naphthol is greater than the weight ratio of alpha-chloronaphthalene to beta-chloronaphthalene initially present in the chloronaphthalene reactant. The reaction is conducted in the presence of a catalyst combination comprising metallic copper and cuprous oxide.

---

This invention concerns a process for the production of alpha-naphthol, which is sometimes identified as 1-naphthol, or 1-hydroxy-naphthalene. More particularly, the invention concerns an improved catalytic process for the production of the alpha-naphthol isomer by the hydrolysis of halonaphthalenes, such as essentially pure beta-chloronaphthalene, or mixtures of alpha- and beta-chloronaphthalene. Still more particularly, the invention relates to the use of an improved catalyst combination in the hydrolysis of a feed which contains beta-chloronaphthalene whereby an increased yield of the desired alpha-hydroxy isomer is obtained.

The hydrolysis of a mono-halogenated naphthalene to produce a mixture of alpha- and beta-naphthols has long been known. For instance, United States Patent No. 1,822,-825 discloses the hydrolysis of a chloronaphthalene to produce the corresponding naphthol isomer in the presence of metallic copper and a salt of a strong base and a weak acid, such as sodium carbonate. Inherently, however, substantial amounts of other isomers are also produced. United States Patent No. 1,992,154 similarly discloses the caustic hydrolysis of pure alpha-bromonaphthalene to form alpha-naphthol in the presence of a "copper containing" catalyst such as cuprous oxide, metallic copper, and copper chloride. In order to obtain the desired alpha product it was thus necessary to resort to the use of relatively expensive bromine. This patent also describes difficulties which were encountered in the prior art when attempting to produce alpha-naphthol without simultaneously producing beta-naphthol. United States Patents Nos. 1,062,351 and 1,996,745 further disclose similar processes which may be conducted in the absence of a catalyst.

The initial chlorination of naphthalene to produce a mono-chloronaphthalene suitable for subsequent hydrolysis and the production of naphthol leads to a product containing both of the possible isomers, i.e., alpha- and beta-chloronaphthalene. Commercially available mono-chloronaphthalene commonly contains an alpha-isomer content of approximately 80 to 98 percent, and a beta-isomer content of approximately 2 to 20 percent. Efforts to efficiently and economically separate the alpha-isomer content of the mono-chloronaphthalene reactants prior to hydrolysis have been largely unsuccessful because of the close boiling points of the two isomers, and their similar chemical behavior. The resulting naphthol hydrolysis product, therefore, commonly contains a mixture of alpha- and beta-naphthol when a mixture of alpha- and beta-isomers forms the mono-chloronaphthalene reactant. It has further been observed that the naphthol product made in accordance with the prior art contains a greater quantity of beta-isomer than the quantity of beta-chloronaphthalene initially present in the reaction mixture with some of the initially present alpha-chloro isomer apparently being converted to the beta-hydroxy isomer in the process.

It is an object of the present invention to provide a process for the hydrolysis of mono-chloronaphthalene in which the production of the alpha-naphthol isomer product is preferentialy enhanced.

It is another object of the present invention to provide a process for the production of the alpha-naphthol isomer in increased quantities by the hydrolysis of mixtures of alpha- and beta-chloronaphthalene.

It is a further object of the invention to provide a process for the hydrolysis of essentially pure beta-chloronaphthalene which produces the alpha-naphthol isomer in increased quantities.

These and other objects, as well as the scope, nature, and utilization of the invention will become more clearly apparent from the following description and appended claims.

Unless otherwise indicated, all proportions of materials are on a weight basis.

It has been discovered that the alpha-naphthol isomer may be preferentially produced by hydrolyzing a mono-chloronaphthalene containing reactant, which may comprise either essentially pure beta-chloronaphthalene or mixtures of alpha- and beta-chloronaphthalene, in a caustic medium in the presence of a catalyst combination of metallic copper and cuprous oxide ($Cu_2O$), and recovering alpha-naphthol. As shown hereinafter, neither metallic copper nor cuprous oxide when used as the sole catalyst in the hydrolysis of chloronaphthalene is capable of producing this surprising result.

It has further been found that the preferential formation of the alpha-isomer employing the novel catalyst combination takes place within the temperature range of approximaely 260° C. to 300° C. If the temperature is allowed to fall substantially below 260° C., then very little hydrolysis occurs. While the hydrolysis conversion rate increases with rising temperature, the preferential formation of alpha-naphthol is only slight at a temperature above approximately 300° C. The preferred temperature range for the process according to the invention is about 270° C. to 290° C., with a reaction temperature of about 275° C. being particularly preferred.

The physical form in which the metallic copper and cuprous oxide may be used may be varied. For instance, both components of the catalyst combination may be in finely divided form and dispersed throughout the reaction mixture by appropriate agitation. A catalyst concentration range for each component of the combination is preferably about 0.005 to 0.2 gram of catalyst per gram of chloronaphthalene charged when the catalyst is present in finely divided form. Instead of adding cuprous oxide directly to the reaction system it is possible to charge cuprous chloride or any other copper salt which will form cuprous oxide in situ upon the addition of a base. It is also possible that the metallic copper component take the form of a lining for the reaction vessel.

The system is preferably agitated throughout the reaction period in order to promote the intimate contact of the two phases present. Such agitation is considered of particular importance during the initial portion of the reaction.

The preferred alkaline medium in which the hydrolysis may be conducted is an aqueous solution of an alkali metal hydroxide, such as sodium hydroxide or potassium hydroxide. While the normality of the solution may be varied over a wide range, it has been found that a solution of approximately 2.8 N to 8.0 N produces an efficient and readily controllable reaction rate. A 3.8 to 5.0 N sodium hydroxide solution is particularly preferred. There preferably should be present in the reaction vessel for each mole of chloronaphthalene approximatley 2.0 to 6.0 moles of alkali metal hydroxide. A mole ratio of chloronaphthalene to sodium hydroxide of approximately 1:2.5 is particularly preferred. If desired the alkali metal hydroxide may be charged into a suitable reaction vessel in pellet form along with the catalyst and immediately dissolved in water with agitation.

Other caustic substances such as sodium carbonate and ammonium hydroxide may also be used.

The time required to conduct the hydrolysis step of the process varies with the concentration of the caustic medium. When sodium hydroxide is employed in the preferred concentration range the desired hydrolysis is usually obtained within a period of about ten minutes to six hours, e.g, in about one to three hours. When the reaction time exceeds three hours the total conversion of chloronaphthalene to naphthol will in most cases be increased to only a minor extent.

Once the hydrolysis has progressed to the desired degree of conversion the product may be recovered by cooling the reaction mixture, and acidifying it in an otherwise conventional manner, such as by the addition of concentrated hydrochloric acid, sulfuric acid, or other strong inorganic acid. The naphthol product will separate, and may be removed by extraction using an organic solvent such as ether, benzene, chloroform, etc. Any unreacted chloronaphthalene will be present in the organic layer with the product and may be subsequently separated by distillation. The naphthol product may also be recovered through phase separation followed by distillation of the organic layer, and extraction of the aqueous layer to remove any traces of alpha-naphthol. Alphachloronaphthalene is a satisfactory extractant for this purpose.

The subject process may be conducted on either a batch or a continuous basis. When operated on a continuous basis unreacted chloronaphthalene is separated and recycled to the reactor along with a fresh charge of reactants for further conversion. The solid catalyst may be separated by filtration and recycled for reuse.

Examples

Table I which follows sumarizes typical results obtained when mono-chloronaphthalene is hydrolyzed in accordanec with prior teachings in an aqueous caustic medium in the presence of metallic copper, cuprous oxide, or cupric oxide as the sole catalyst, or in the presence of a catalyst combination of cuprous oxide and cupric oxide. In each instance a one-liter stainless steel autoclave provided with stirring means, was charged with one gram mole of commercially available mono-chloronaphthalene containing predominantly alpha-chloronaphthalene and having an alpha/beta isomer ratio as indicated. 2.5 gram moles of sodium hydroxide pellets were next added to the autoclave together with 400 grams of water. The type and amount of catalyst employed in each run are indicated in the table. The metallic copper catalyst was in the form of a finely divided powder obtained by electrolysis. The cuprous oxide was likewise in the form of a finely divided powder. The cupric oxide was in the form of a fine wire cut in lengths of about one-fourth of an inch. The autoclave was sealed and heated with agitation to 275° C. The temperature of the autoclave was maintained at this temperature for one hour.

At the end of one hour the reactor was cooled to room temperature, opened, and the contents acidified by the addition of the necessary amount of hydrochloric acid to make the mixture slightly acid. During acidification the reaction mixture first became cloudy, and later, especially upon cooling, a portion of the mixture precipitated. These solids were removed by ether extraction, and analyzed. The percent yield of naphthol, isomer distribution, and conversion of chloronaphthalene to naphthol are indicated in Table I.

TABLE I

| Run No. | Catalyst | Amount as copper, g. | Time, hours | Temp., ° C. | Conversion, percent | Yield, percent | Alpha/beta content, percent | | Difference in beta content, percent |
|---|---|---|---|---|---|---|---|---|---|
| | | | | | | | Start of reaction | End of reaction | |
| 1 | Copper metal | 22.3 | 1 | 275 | 65.2 | 95.8 | 85.0/15.0 | 78.6/21.4 | +6.4 |
| 2 | do | 4.45 | 1 | 275 | 6.6 | 99.1 | 87.8/12.2 | 82.4/17.6 | +5.4 |
| 3 | CuO | 4.45 | 1 | 275 | 69.1 | 96.7 | 87.8/12.2 | 83.4/16.6 | +4.2 |
| 4 | Cu$_2$O | 4.45 | 1 | 275 | 68.6 | 95.9 | 87.8/12.2 | 87.5/12.5 | +0.3 |
| 5 | 50% CuO, 50% Cu$_2$O | 4.45 | 1 | 275 | 63.1 | 96.8 | 87.8/12.2 | 83.1/16.9 | +4.7 |
| 6 | None | | 1 | 275 | 4.8 | 99.0 | 87.8/12.2 | 66.3/33.7 | +21.5 |

The results of Runs No. 1 to 6 as reported above indicate that when the caustic hydrolysis of mono-chloronaphthalene is conducted in the presence of copper metal, cuprous oxide, cupric oxide, or a combination of cuprous oxide and cupric oxide, a beta-isomer content in the hydroxylated reaction product higher than that present in the chlorinated naphthalene feed is obtained. The smallest increase in beta-isomer content occurred in Run No. 4 where cuprous oxide was employed as the sole catalyst, but even there a definite preferential formation of the beta-isomer was detected. Run No. 6 which was carried out in the absence of a catalyst shows a conversion of only 4.8 percent.

Table II which follows summarizes typical results obtained when a catalyst combination of metallic copper and cuprous oxide is employed according to the present invention. In Runs No. 7 and 8 the metallic copper component of the catalyst combination was present in the form of a lining for the autoclave, while in Run No. 9 the metallic copper was in the form of finely divided particles. A one-liter stainless steel autoclave provided with a stirrer, and fitted with a copper lining in Runs No. 7 and 8, was charged with one mole of commercially available monochloronaphthalene containing 85 percent alpha-isomer and 15 percent beta-isomer. 2.5 gram moles of sodium hydroxide pellets, together with 400 grams of water, were next charged into the autoclave. The autoclave, after being sealed, was heated with agitation to 275° C., and maintained at that temperature for the indicated period of time. The recovery operation was the same as in previously reported Runs No. 1 to 6.

TABLE II

| Run No. | Catalyst | Amount as copper, g. | Time, hours | Temp., °C. | Conversion, percent | Yield, percent | Alpha/beta content, percent | | Difference in beta content, percent |
|---|---|---|---|---|---|---|---|---|---|
| | | | | | | | Start of reaction | End of reaction | |
| 7 | Copper lined autoclave, Cu₂O | 4.45 | 3 | 275 | 99.8 | 93.9 | 85.0/15.0 | 87.3/12.7 | −2.3 |
| 8 | do | 0.89 | 1 | 275 | 45.5 | 97.0 | 85.0/15.0 | 90.3/9.7 | −5.3 |
| 9 | Copper metal | 2.0 | | | | | | | |
| | Cu₂O | 2.45 | 1 | 275 | 86.9 | 93.9 | 85.0/15.0 | 86.8/13.2 | −1.8 |

The results of Runs No. 7 to 9 indicate that the beta-isomer content present in the reaction product is consistently reduced and the alpha-isomer increased when the caustic hydrolysis of mono-chloronaphthalene is conducted in the presence of the novel catalyst combination comprising metallic copper and cuprous oxide. While the results obtained are surprising and incapable of simple explanation, it would appear that some of the beta-chloronaphthalene is preferentially isomerized and hydrolyzed to yield alpha-naphthol, and the alpha-chloronaphthalene hydrolyzed to yield only alpha-naphthol. The end result is a product enriched in alpha-naphthol content which could not be readily obtained in any other manner using the same reactants.

RUN 10

The results obtained according to the invention were found to be particularly outstanding when chloronaphthalene is selected for hydrolysis which contains more than 90 percent alpha-isomer. A 300 ml. copper lined autoclave was charged with 0.3 gram mole of chloronaphthalene containing 94.6 percent alpha-chloronaphthalene and 5.4 percent beta-chloronaphthalene. 0.75 gram mole sodium hydroxide, 1.5 grams finely divided cuprous oxide, and 120 grams of water were introduced into the reactor equipped with suitable stirring means. The autoclave was sealed and heated with agitation to 275° C. After this temperature had been maintained for one hour the contents were cooled and the product was recovered as described in the prior examples. Analysis of product revealed that a naphthol yield of 94.2 percent had been obtained at a conversion level of 67.8 percent. The beta-isomer content was reduced from 5.4 percent in the reactant to 0.6 percent in the product, in effect resulting in the production of substantially pure alpha-naphthol without requiring any separate step to remove beta-naphthol.

RUN 11

The preferential hydrolysis of chloronaphthalene according to the present invention is also strikingly apparent when pure beta-chloronaphthalene is selected as the reactant. A 300 ml. copper lined autoclave was charged with 0.2 gram mole of essentially pure beta-chloronaphthalene, 0.8 gram mole sodium hydroxide, 1.0 gram of finely divided cuprous oxide, and 128 grams of water. The autoclave was sealed and heated with agitation to 275° C. After one hour at this temperature, the autoclave was cooled and the product recovered in the manner previously described. Analysis of the product revealed a naphthol yield of 85 percent at a conversion of 58 percent. The beta-isomer content was changed from 100 percent in the chlorinated feed to only 47 percent in the naphthol product, and the alpha-isomer content was correspondingly increased from 0 percent to 53 percent.

Alpha-naphthol finds utility as an intermediate in making dyes, synthetic perfumes and other organic chemicals according to procedures and techniques known in the art. Whenever a product or intermediate of high alpha-naphthol purity is required the present process may be advantageously utilized. When essentially pure alpha-naphthol is required the preferential formation of this compound according to the present invention simplifies subsequent purification operations.

Having thus fully described our invention what we claim is:

1. A process for the preferential production of alpha-naphthol which comprises heating a chloronaphthalene reactant selected from the group consisting essentially of beta-chloronaphthalene and mixtures of alpha- and beta-chloronaphthalene, in an aqueous caustic medium in the presence of metallic copper and cuprous oxide at a temperature of between about 260° C. and 300° C., to form a naphthol product consisting of alpha- and beta-naphthol in which the weight ratio of alpha-naphthol to beta-naphthol is greater than the weight ratio of alpha-chloronaphthalene to beta-chloronaphthalene in said chloronaphthalene reactant, and recovering said naphthol product from the resulting reaction mixture.

2. A process according to claim 1 in which the caustic medium is an aqueous solution of sodium hydroxide.

3. A process according to claim 1 in which a chloronaphthalene reactant mixture containing about 80 to 98 percent alpha-chloronaphthalene and about 2 to 20 percent beta-chloronaphthalene is employed.

4. A process according to claim 1 in which said naphthol product is recovered by acidification of the resulting reaction mixture followed by extraction with a selective solvent.

5. A process according to claim 1 in which unreacted chloronaphthalene reactant is separated from the reaction mass and recycled to the reaction system for further conversion.

6. A process for the preferential production of alpha-naphthol which comprises heating a chloronaphthalene reactant selected from the group consisting essentially of beta-chloronaphthalene and mixtures of alpha- and beta-chloronaphthalene in aqueous sodium hydroxide in the presence of catalytic amounts of metallic copper and cuprous oxide at a reaction temperature of between about 270° C. and 290° C., to form a naphthol product consisting of alpha- and beta-naphthol in which the weight ratio of alpha-naphthol to beta-naphthol is greater than the weight ratio of alpha-chloronaphthalene to beta-chloronaphthalene in said chloronaphthalene reactant, and recovering said naphthol product from the resulting aqueous mixture.

7. A process according to claim 6 in which about 2 to 6 moles of sodium hydroxide are added to the process for each mole of said chloronaphthalene reactant.

8. A process according to claim 6 in which said chloronaphthalene reactant comprises a mixture of about 80 to 98 percent alpha-chloronaphthalene and about 2 to 20 percent beta-chloronaphthalene.

9. A process according to claim 6 in which the chloronaphthalene reactant is chloronaphthalene containing more than 90 percent alpha-isomer.

10. A process according to claim 6 in which the naphthol product is recovered by acidification of the resulting aqueous mixture followed by extraction.

11. A process according to claim 6 in which unreacted chloronaphthalene reactant is separated from the reaction mass and recycled to the reaction system for further conversion.

12. A process according to claim 7 in which the chloronaphthalene reactant is maintained in the aqueous medium at said reaction temperature for about 10 minutes to 6 hours.

13. A process for the preferential production of alpha-naphthol which comprises heating with agitation a reactant mixture of alpha- and beta-chloronaphthalene in an aqueous solution containing about 2.5 moles of sodium hydroxide for each mole of alpha- and beta-chloronaphthalene in the presence of metallic copper and cuprous oxide at a temperature of approximately 275° C., to form a naphthol product consisting of alpha- and beta-naphthol in which the weight ratio of alpha-naphthol to beta-naphthol is greater than the weight ratio of alpha-chloronaphthalene to beta-chloronaphthalene in said reactant mixture acidifying the resulting reaction mixture, and extracting said naphthol product from the acidified mixture with an organic solvent therefor.

14. A process according to claim 13 in which the reactant mixture contains about 80 to 98 percent alpha-chloronaphthalene and about 2 to 20 percent beta-chloronaphthalene.

15. A process according to claim 13 in which unreacted chloronaphthalene is separated from the reaction mass and recycled to the reaction system for further conversion.

References Cited
UNITED STATES PATENTS

| | | | |
|---|---|---|---|
| 1,959,283 | 5/1934 | Britton | 260—629 |
| 1,992,154 | 2/1935 | Britton et al. | 260—629 |
| 2,126,610 | 8/1938 | Britton | 260—629 |

LEON ZITVER, *Primary Examiner.*

W. B. LONE, *Assistant Examiner.*